United States Patent [19]

Pelezo et al.

[11] Patent Number: 4,615,740
[45] Date of Patent: Oct. 7, 1986

[54] LIQUID POLYMER CONTAINING COMPOSITIONS FOR THICKENING AQUEOUS MEDIUMS

[75] Inventors: James A. Pelezo, Spring; Garry E. Corbett, Jr.; Don R. Siems, both of Houston, all of Tex.

[73] Assignee: NL Industries, Inc., New York, N.Y.

[21] Appl. No.: 709,547

[22] Filed: Mar. 8, 1985

[51] Int. Cl.[4] .......................... C08L 1/08; E21B 43/27
[52] U.S. Cl. .................................. 106/177; 252/8.551
[58] Field of Search ........................ 106/177; 252/8.55

[56] References Cited

U.S. PATENT DOCUMENTS

| | | | |
|---|---|---|---|
| 4,316,810 | 2/1982 | Burnham | 252/8.55 R |
| 4,496,468 | 1/1985 | House et al. | 252/8.55 R |

*Primary Examiner*—Theodore Morris
*Attorney, Agent, or Firm*—Browning, Bushman, Zamecki & Anderson

[57] ABSTRACT

A liquid, polymer-containing composition for viscosifying oilfield brines comprising an oil base liquid, an effective, gelling amount of a gelling agent which is an aluminum phosphate compound and hydroxyethyl cellulose, the compositions preferably containing, in addition, a surfactant to retard settling and hard packing of the hydroxyethyl cellulose.

7 Claims, No Drawings

LIQUID POLYMER CONTAINING COMPOSITIONS FOR THICKENING AQUEOUS MEDIUMS

BACKGROUND OF THE INVENTION

The present invention relates to liquid, polymer containing compositions for use as thickening agents in aqueous mediums and, more particularly, to liquid, polymer containing compositions which can be used to viscosify brines to provide thickened aqueous well drilling and treating fluids.

The use of polymers such as hydroxyethyl cellulose (HEC) in fluids, e.g. brines, used in well drilling and treating fluids to improve viscosity, solids removal and/or filtration control has met with much success in past years. It is known, however, that the direct application of the dry powder form of these powders results in the formation of "fish eyes," i.e. unhydrated lumps of polymer, which can result in operational problems such as blinding of shaker screens and formation plugging. These problems can be minimized by adding the polymer in the form of a solution, colloid or other uniform suspension dispersed in a non-solvent carrier medium such as an oil-base liquid, e.g. diesel oil, kerosene. In co-pending Application Ser. No. 115,405 filed Jan. 25, 1980, there is disclosed one such HEC formulation which has met with great success. However, the composition disclosed in the aforementioned copending application suffers from the disadvantage that if the formulation is stored under static conditions for an extended period of time, some undesirable settling and hard packing of the HEC results. Redispersion of the HEC is time-consuming, requires special equipment and therefore is generally not conducive to on-site drilling, workover or completion operations.

Another disadvantage of the composition disclosed in the aforementioned co-pending application is that the composition, because it contains clay, is not completely acid soluble. As is well known, in the case of fluids used in workover and completion applications, it is desirable, and in some cases essential, that the fluid be acid soluble so that it can be displaced from the formation if necessary without damaging the formation.

SUMMARY OF THE INVENTION

It is therefore an object of the present invention to produce an improved, liquid polymer containing composition useful in the thickening of aqueous media.

A further object of the present invention is to provide an improved aqueous well treating or drilling fluid.

Still another object of the present invention is to provide a liquid, polymer containing composition which can be admixed with oil-filled brines and the like to form thickened aqueous well drilling and treating fluids and which is essentially acid soluble.

The above and other objects of the present invention will become apparent from the description given herein and the appended claims.

In accordance with the present invention, there is provided a liquid, polymer containing composition which can be used for thickening aqueous mediums such as fresh water, oil-filled brines and the like to provide well drilling and treating fluids, e.g. completion and workover fluids. The composition includes HEC, and oil-base or hydrophobic liquid and an effective amount of a gelling agent comprised of an aluminum salt of one or more oxyalkyl phosphates and/or oxyaalkyl alkyl phosphates. The oil-based liquid is generally speaking a hydrocarbon in which the HEC is substantially non-swellable. In a particularly preferred embodiment of the present invention, there is included a surfactant which aids in preventing settling and hard packing of the HEC. The liquid, polymer containing compositions, when admixed with aqueous mediums, particularly oil-field brines, provide ideal well drilling or treating fluids.

DESCRIPTION OF THE PREFERRED EMBODIMENTS

The novel, liquid polymer containing compositions of the present invention utilize hydroxyethyl cellulose (HEC) as the primary component to effect thickening of the aqueous medium. Hydroxyethyl cellulose is a high yield, water-soluble nonionic polymer produced by treating cellulose with sodium hydroxide followed by reaction with ethylene oxide. Each anhydroglucose unit in the cellulose molecule has three reactive hydroxy groups. The average number of moles of ethylene oxide that become attached to each anhydroglucose unit in cellulose is called moles of substituent combined. In general, the greater the degree of substitution, the greater the water solubility. While HEC having a mole substitution level as low as 1.5 can be used, it is preferable to use HEC having a mole substitution level of 1.8 or greater, especially 2.5 and greater. It will be understood that the particular HEC chosen will depend upon the type of liquid polymer composition, and ultimately the type of well drilling or treating fluid, desired. For example, so called surface treated HEC such as described in U.S. Pat. Nos. 3,455,714; 2,879,268 and 3,072,035 can be used with advantage. Such surface treated HEC exhibits greater dispersability in the composition. The HEC will be present in the liquid polymer containing composition in amounts from about 25 to about 55% by weight, based on the total weight of the liquid, polymer containing composition.

The oil base liquid used in preparing the composition of the present invention, in general, is any hydrocarbon which does not cause significant swelling or thickening of the HEC. Exemplary oil base liquids include liquid aliphatic and aromatic hydrocarbons, particularly those containing five to ten carbon atoms, diesel oil, kerosene, petroleum distillates, petroleum oils, mineral oil and the like. Generally speaking, the oil base liquid will be non-polar and will have a low pour point. A particularly preferred oil base liquid is a paraffin base oil of the mineral seal or white mineral oil type which is substantially free of aromatic compounds. Such oils, since they are biodegradable, are environmentally safe and find particular utility in offshore operations. The oil base liquid will be present in the composition of the present invention in amounts of from about to 35 to about 75 percent by weight, based on the total weight of the composition, and preferably from about 40 to about 60 percent by weight, based on the total weight of the composition.

The gelling agent used in the compositions of the present invention is the gelling agent disclosed in U.S. Pat. No. 4,316,810, incorporated herein by reference for all purposes. As disclosed in the aforementioned patent, the gelling compounds can be generically represented by the structural formula:

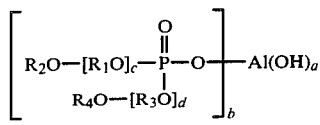

where
a = 0 to 2
b = 1 to 3
c = 1 to 5
d = 1 to 5,
and the sum of a+b=3

R$_1$O and R$_3$O = an alkyloxy, alkenyloxy or alkynyloxy group containing from 1 to 18 carbon atoms, or CH$_2$CH(CH$_3$)O, or CH$_2$CH$_2$O or OH, and R$_2$O and R$_4$O = an alkyloxy, alkenyloxy or alkynyloxy group containing from 1 to 18 carbon atoms, and R$_1$O and R$_2$O may differ from each other but shall together contain from 1 to 24 carbon atoms, and R$_3$O and R$_4$O may differ from each other but shall together contain from 1 to 20 carbon atoms, provided that at least one of R$_1$O and R$_1$O shall be either CH$_2$CH(CH$_3$)O or CH$_2$CH$_2$O, and provided further that where either R$_1$O or R$_3$O is neither CH$_2$CH(CH$_3$)O nor CH$_2$CH$_2$O, then the respective R$_2$O or R$_4$O group otherwise bonded thereto shall be deleted. From the foregoing definitions of structure it will be understood that in the term "oxyaalkyl", the term "alkyl" is being used in the generic sense to include straight and branched chain, saturated and unsaturated aliphatic hydrocarbon groups.

The amount of the aluminum oxaaalkyl phosphate salt, i.e. the gelling agent, utilized in the composition of the present invention will be from about 0.15 to about 6 weight percent, based on the total weight of the composition. Preferably, at least about 0.25 weight percent of the gelling agent is added to the oil base liquid with the most preferred compositions containing from about 0.3 to about 2 percent by weight. The gelling agent can be added either as a pre-prepared salt or can be formed in situ. The latter procedure constitutes the preferred method of incorporation of the gelling agent into the thickening composition of the present invention since better control of the properties of the composition is achieved.

Where in situ formation of the gelling agent is the procedure followed, the phosphoric acid ester precursor is initially added to the oil base fluid in an amount so as to provide the desired amount of gelling agent specified above. An appropriate amount of the sodium aluminate, preferably admixed with sodium hydroxide and water, is then added to the oil base liquid.

Although the compositions of the present invention provide clay free, liquid, polymer-containing compositions which minimize settling and hard packing of the HEC, it is desirable to further retard such settling and hard packing by incorporating a surfactant into the compositions. Non-limiting examples of suitable surfactants include sorbitan, fatty acid esters such as sorbitan monolaurate, sorbitan monooleate, sorbitan monostearate, sorbitan monopalmitate, sorbitan tristearate, etc.; polyoxyethelene sorbitan fatty acid esters such as polyoxyethelene sorbitan monolaurate, polyoxyethelene sorbitan monopalmitate, etc.; alkyl aryl sulfanates; polymeric fatty esters, etc. It will be appreciated that the type and amount of surfactant employed will depend upon the concentration of the HEC, storage time of the polymer composition and other such variables. Generally speaking however, the surfactant will be employed in an amount of from about 0.25% to about 4% by weight, based on the total weight of the polymer composition.

In preparing the liquid, polymer-containing compositions, and when in situ formation of the gelling agent is employed, the phosphoric acid ester is added to the oil base liquid and stirred followed by addition of the sodium aluminate solution, stirring being continued for a suitable period of time until the reaction between the sodium aluminate and the phosphoric acid ester is complete. Following this, and optionally, the surfactant is added and the mixture stirred. The HEC is then added and the composition then thoroughly mixed, with shear, until the desired viscosity is achieved.

The compositions of the present invention find particular use in the preparation of fluids such as completion fluids and workover fluids. In the preparation of such fluids, the liquid, polymer compositions are admixed with a suitable aqueous medium. While the aqueous medium can comprise fresh water, tap water, etc., preferably the aqueous medium will be one which contains a soluble salt such as, for example, a soluble salt of an alkali metal, and alkaline earth metal, a Group IB metal, a Group IIB metal, as well as water-soluble salts of ammonia and other anions. In particular, brines containing sodium chloride and/or calcium chloride, when admixed with the liquid polymer compositions herein, make excellent workover fluids. The amount of the water-soluble salt dissolved in the aqueous medium will vary depending upon the desired density of the well drilling or treating fluid. For example, it is common to employ saturated solutions of sodium chloride and/or calcium chloride in preparing such fluids. In preparing aqueous well drilling and treating fluids using the liquid, polymer containing compositions, the amount of the liquid polymer composition added will vary depending upon the viscosity desired. Desirable well drilling and treating fluids can be made by combining an aqueous medium with sufficient liquid, polymer containing compositions such that the final mixture contains from about 0.1 to about 2 pounds per barrel (ppb) of HEC.

To further illustrate the invention, the following non-limiting examples are presented. In all cases, the HEC used was Natrasol 250 HHR marketed by Hercules, Incorporated.

EXAMPLE 1

Acid soluble (15 percent aqueous HCl) liquid, polymer compositions of HEC were prepared using No. 2 diesel oil as the oil base liquid. The aluminum oxaaalkyl phosphate salt was obtained, in situ, by combining a phosphoric acid ester, as described above, and sold under the trade name ASP-162 by Nalco Chemical Company with an aqueous sodium hydroxide solution of sodium aluminate sold under the trade name ASP-200 by Nalco Chemical Co. Tables I and II below show various formulations (Table I) and rheological properties thereof (Table II).

TABLE I

Weight Percentage of Components

| Sample No. | Diesel | HEC | Phosphoric Acid Ester | Sodium Aluminate | Comment |
|---|---|---|---|---|---|
| 1 | 52.0 | 45 | 4.6 | 0.40 | Good suspension Poor pourability |
| 2 | 51.0 | 45 | 3.7 | 0.30 | Good suspension Fair pourability |
| 3 | 53.1 | 45 | 1.5 | 0.15 | Fair suspension Good pourability |
| 4 | 53.6 | 45 | 1.0 | 0.50 | Poor suspension |
| 5 | 54.1 | 45 | 0.1 | 0.05 | Hard packing |

TABLE II

| Sample No. | $\theta$ 600 | $\theta$ 300 | PV | AV | YP | Comment |
|---|---|---|---|---|---|---|
| 1 | >300 | 275 | — | — | — | Good suspension Poor pourability |
| 2 | 290 | 185 | 105 | 145 | 80 | Good suspension Fair pourability |
| 3 | 197 | 150 | 47 | 98 | 103 | Fair suspension Good pourability |
| 4 | 163 | 99 | 64 | 81 | 35 | Poor suspension |
| 5 | 140 | 87 | 53 | 70 | 34 | Poor suspension |

EXAMPLE 2

A series of brines, viscosified with a liquid polymer composition designated as Sample No. 2 in Example 1 was compared with a like series of brines viscosified with the liquid polymer composition disclosed in copending application Ser. No. 115,405 (Prior Liquid Polymer). The rheology of the samples was evaluated using a FANN model 35A viscometer. The results are shown in Tables III–VI below.

TABLE III

Plastic Viscosity Produced by Sample 2 of Example 1

| Medium | Blank | 1 | 2 | 3 | 4 | 5 |
|---|---|---|---|---|---|---|
| | | | | (ppb) | | |
| Water | 1.0 | 12.0 | 15.0 | 27.0 | 36.0 | — |
| NaCl (10.0 ppb) | 2.0 | 8.0 | 9.0 | 13.0 | 18.0 | 41.0 |
| NaBr (11.0 ppb) | 1.5 | 4.0 | 12.0 | 20.0 | 49.0 | 64.0 |
| CaCl$_2$ (11.6 ppb) | 8.0 | 8.5 | 11.0 | 14.5 | 27.5 | 52.5 |
| CaBr$_2$ (14.2 ppb) | 7.0 | 10.0 | 10.0 | 10.0 | 12.0 | 15.0 |
| KCl (9.7 ppb) | 3.5 | 4.0 | 8.0 | 14.0 | 18.0 | 20.0 |
| CaCl$_2$/CaBr$_2$ (12.5 ppb) | 9.0 | 14.0 | 11.5 | 14.0 | 14.5 | 16.0 |
| CaCl$_2$/CaBr$_2$/ZnBr$_2$ (18.0 ppb) | 23.0 | 21.0 | 19.5 | 20.0 | 24.0 | 20.0 |
| ZnBr$_2$ (19.2 ppb) | 30.0 | 23.0 | 23.0 | 23.0 | 23.0 | 23.0 |

TABLE IV

Plastic Viscosity Produced by Prior Liquid Polymer

| Medium | Blank | 1 | 2 | 3 | 4 | 5 |
|---|---|---|---|---|---|---|
| | | | | (ppb) | | |
| Water | 1.0 | 7.0 | 10.0 | 13.0 | 19.0 | 25.0 |
| NaCl | 2.0 | 9.0 | 13.0 | 17.0 | 20.0 | 25.0 |
| NaBr | 1.5 | 8.0 | 11.0 | 18.0 | 17.0 | 28.0 |
| CaCl$_2$ | 8.0 | 13.5 | 22.0 | 26.0 | 32.0 | 35.0 |
| CaBr$_2$ | 7.0 | 10.0 | 9.5 | 13.0 | 12.5 | 14.0 |
| KCl | 3.5 | 6.5 | 8.5 | 12.5 | 15.0 | 20.0 |
| CaCl$_2$/CaBr$_2$ | 9.0 | 12.0 | 14.0 | 17.5 | 20.5 | 24.0 |
| CaCl$_2$/CaBr$_2$/ZnBr$_2$ | 23.0 | 20.0 | 20.5 | 22.0 | 21.5 | 24.0 |

TABLE V

Yield Point Produced by Sample 2 of Example 1

| Medium | Blank | 1 | 2 | 3 | 4 | 5 |
|---|---|---|---|---|---|---|
| | | | | (ppb) | | |
| Water | 1.0 | 10.0 | 42.0 | 83.0 | 154.0 | — |
| NaCl | 2.0 | 3.0 | 9.0 | 18.0 | 41.0 | |
| NaBr | 1.0 | 4.0 | 12.0 | 20.0 | 49.0 | 64.0 |
| CaCl$_2$ | 1.0 | 3.5 | 11.0 | 14.5 | 27.5 | 52.5 |
| CaBr$_2$ | 3.0 | 3.0 | 2.0 | 2.0 | 3.0 | 5.0 |
| KCl | 1.5 | 2.0 | 4.0 | 13.0 | 26.0 | 46.0 |
| CaCl$_2$/CaBr$_2$ | 0.0 | 1.0 | 3.5 | 2.5 | 2.0 | 2.0 |
| CaCl$_2$/CaBr$_2$/ZnBr$_2$ | 3.0 | 0.0 | 0.0 | 0.0 | 0.0 | 3.0 |
| ZnBr$_2$ | 0.0 | 2.0 | 3.0 | 4.0 | 5.0 | 6.0 |

TABLE VI

Yield Point Produced by Prior Liquid Polymer

| Medium | Blank | 1 | 2 | 3 | 4 | 5 |
|---|---|---|---|---|---|---|
| | | | | (ppb) | | |
| Water | 1.0 | 3.0 | 9.0 | 12.0 | 55.0 | 61.0 |
| NaCl | 2.0 | 1.0 | 7.0 | 19.0 | 29.0 | 44.0 |
| NaBr | 1.0 | 5.0 | 8.0 | 28.0 | 48.0 | 64.0 |
| CaCl$_2$ | 1.0 | 1.5 | 7.0 | 19.0 | 40.0 | 75.0 |
| CaBr$_2$ | 3.0 | 1.0 | 2.0 | 2.0 | 4.5 | 5.5 |
| KCl | 1.5 | 2.0 | 6.5 | 13.0 | 26.0 | 41.0 |
| CaCl$_2$/CaBr$_2$ | 0.0 | 0.0 | 3.5 | 4.5 | 6.0 | 10.0 |
| CaCl$_2$/CaBr$_2$/ZnBr$_2$ | 3.0 | 0.0 | 1.0 | 1.5 | 3.0 | 1.0 |

A comparison of the apparent viscosity of Sample No. 2 with the Prior Liquid Polymer composition showed that both were equally effective in viscosification of the brines listed in Tables III–VI above.

To determine the acid solubility of the polymer containing compositions, samples of 2 ml each of Sample No. 2 were placed into each of three, 100 ml aqueous solutions of 15% HCl and stirred with heating. In all cases, the solute disbursed and dissolution occurred leaving a non-viscous clear solution. It can thus be seen from Tables III–VI that the liquid, polymer compositions of the present invention, which are free of clay and therefore completely acid soluble, are as effective in viscosifying typical oil field brines as the Prior Liquid Polymer composition which contains a clay based gelling agent and which has been successfully used commercially in typical oil field operations such as workovers, completions and the like. As noted above, acid dissolution is an important feature, particularly in completion operations, since residual, nondissolved solids in the fluids can damage the producing formation.

EXAMPLE 3

The addition of a surfactant in retarding settling and hard packing of HEC in a liquid, polymer composition (Sample A) containing no surfactant is compared with a liquid, polymer-containing composition having essentially the same composition as Sample B but containing, in addition, a polymeric fatty ester surfactant marketed as Solsperse 6000 by ICI. Both samples are static aged at 120° F. for 20 days. It is observed that whereas significant settling and hard packing of HEC occurs in Sample A, there is little or no settling or hard packing of HEC in Sample B.

EXAMPLE 4

A liquid, polymer-containing composition was formulated by admixing together 53.44% by weight of a substantially aromatic-free mineral oil, sold under the trade name Mentor 28 by Exxon, 0.48% by weight of a phosphoric acid ester sold as ASP-166, 0.08% by weight of a sodium aluminate/sodium hydroxide solution sold as ASP-200, 1.00% by weight of a polymeric fatty ester surfactant sold as Solsperse 6000 and 45.00% weight of HEC. The formulation thus produced flowed freely and exhibited no settling or hard packing after static aging at 120° F. for one week, the composition also remaining pourable after one week. The composition effectively viscosified 10 ppg NaCl brine and 11.6 ppg $CaCl_2$ brine. This example shows that the present invention permits the preparation of environmentally safe, clay free, acid dispersible viscosifying compositions for brines. The liquid, polymer-containing composition, since they are stable, i.e. minimal settling or hard packing, can be stored and used more easily than formulations in which the HEC settles and hard packs requiring cumbersome and generally unavailable mixing equipment.

The invention may be embodied in other specific forms without departing from the spirit or essential characteristics thereof. The present embodiments are therefore to be considered, in all respects as illustrative and not restrictive, the scope of the invention being indicated by the appended claims rather than by the foregoing description, and all changes which come within the meaning and range of equivalence of the claims are therefore intended to be embraced therein.

What is claimed is:

1. A liquid, pourable, water dispersible polymer containing composition for thickening aqueous mediums comprising hydroxyethyl cellulose, an oil base liquid, and an effective, gelling amount of a gelling agent comprising at least one compound selected from the group of aluminum salts consisting of aluminum oxyalkyl phosphates, aluminum oxyalkyl oxyalkyl phosphates and aluminum oxyalkyl alkyl phosphates, said salts having the structural formula

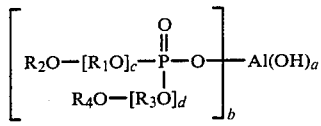

where
a = 0 to 2,
b = 1 to 3,
c = 1 to 5,
d = 1 to 5,
and the sum of a + b = 3;

$R_1O$ and $R_3O$ = an alkyloxy, alkenyloxy or alkynyloxy group containing from 1 to 18 carbon atoms, or $CH_2CH(CH_3)O$, or $CH_2CH_2O$ or OH, and $R_2O$ and $R_4O$ = an alkyloxy, alkenyloxy or alkynyloxy group containing from 1 to 18 carbon atoms, and where $R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ and $R_4O$ group otherwise bonded thereto shall be deleted and further provided that the number of carbon atoms in at least one of $R_1O$, $R_2O$, $R_3O$ and $R_4O$ is at least 6, and an effective amount of a surfactant sufficient to retard settling and hard packing of said hydroxyethyl cellulose.

2. The composition of claim 1 wherein said hydroxyethyl cellulose is present in an amount of from about 25 to about 55% by weight, based on the weight of said composition.

3. The composition of claim 1 wherein said gelling agent is present in an amount of from about 0.15% to about 6.0% weight, based on the total weight of said composition.

4. The composition of claim 1 wherein said oil base liquid is present in an amount of from about 35 to about 75% by weight, based on the total weight of said composition.

5. The composition of claim 1 wherein said surfactant is present in an amount of from about 0.25% to about 4% by weight, based on the total weight of said composition.

6. The composition of claim 1 wherein said oil base liquid is selected from the class consisting of liquid aliphatic and aromatic hydrocarbons, petroleum oils, diesel oil, kerosene, substantially aromatic-free mineral oil and mixtures thereof.

7. The composition of claim 6 wherein said oil base liquid comprises a substantially aromatic-free mineral oil.

* * * * *